(12) United States Patent
Wang et al.

(10) Patent No.: US 7,072,431 B2
(45) Date of Patent: Jul. 4, 2006

(54) CLOCK TIMING RECOVERY USING ARBITRARY SAMPLING FREQUENCY

(75) Inventors: Vincent Wang, West Bloomfield, MI (US); J. William Whikehart, Novi, MI (US); John Elliott Whitecar, Plymouth, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 770 days.

(21) Appl. No.: 10/284,231

(22) Filed: Oct. 30, 2002

(65) Prior Publication Data

US 2004/0086067 A1    May 6, 2004

(51) Int. Cl.
*H04L 7/00* (2006.01)
(52) U.S. Cl. .................. 375/355; 375/374; 327/141
(58) Field of Classification Search ........... 375/355, 375/238, 374, 326; 327/147, 141
See application file for complete search history.

(56) References Cited

U.S. PATENT DOCUMENTS

| | | | |
|---|---|---|---|
| 3,805,180 A | 4/1974 | Widmer | |
| 4,330,759 A | 5/1982 | Anderson | |
| 5,199,046 A | 3/1993 | Ling | |
| 5,216,717 A | 6/1993 | Bourcet et al. | |
| 5,636,249 A | 6/1997 | Roither | |
| 5,682,605 A * | 10/1997 | Salter | 375/145 |
| 5,928,293 A | 7/1999 | Jobling et al. | |
| 5,969,631 A * | 10/1999 | Ammler et al. | 340/825.21 |
| 5,970,093 A | 10/1999 | de Lantremange | |
| 6,141,378 A | 10/2000 | d'Oreye de Lantremange | |
| 6,178,213 B1 | 1/2001 | McCormack et al. | |
| 6,229,862 B1 | 5/2001 | Webb | |
| 6,665,359 B1 * | 12/2003 | Flake | 375/354 |

FOREIGN PATENT DOCUMENTS

| | | |
|---|---|---|
| EP | 0311974 | 4/1989 |
| EP | 0877506 | 11/1998 |

* cited by examiner

*Primary Examiner*—Mohammed Ghayour
*Assistant Examiner*—Leila Malek
(74) *Attorney, Agent, or Firm*—MacMillan, Sobanski & Todd, LLC

(57) ABSTRACT

A bit timing signal is regenerated from an encoded digital signal in a receiver using a predetermined sample rate $F_s$. An input pulse signal is generated in response to predetermined transitions of the encoded digital signal. A clock count signal is generated having a variable clock period according to cyclical counting of the clock count signal up to a count value S at the predetermined sample rate, the count value alternating between an upper value $S_u$ and a lower value $S_l$ so that the variable clock period has an average length substantially equal to a data bit period of the encoded digital signal. The clock count signal is synchronized with the encoded digital signal by 1) counting the input pulse signals to generate a pulse count, 2) counting sampling periods between successive input pulse signals to generate a sample count, and 3) generating a sync signal if the pulse count is greater than a pulse threshold and the sample count is greater than a sample threshold. The clock count signal and the pulse count are reset in response to the sync signal.

17 Claims, 4 Drawing Sheets

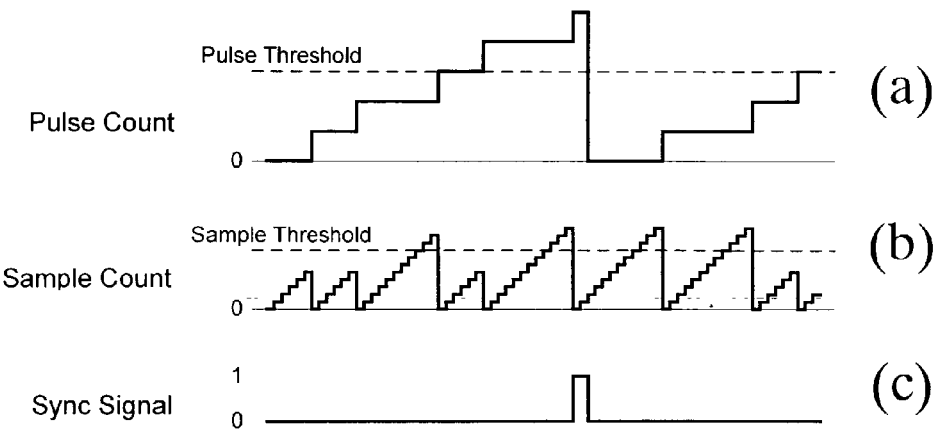
Fig. 5
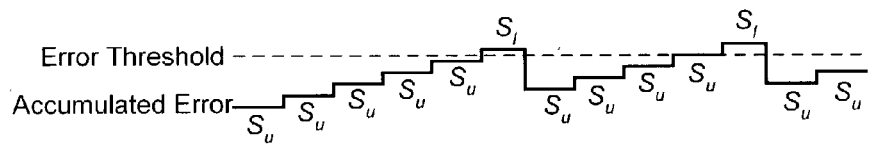
Fig. 6
Fig. 7

CLOCK TIMING RECOVERY USING ARBITRARY SAMPLING FREQUENCY

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to recovering a clock signal for a digital data transmission, and, more specifically, to recovering a clock signal without requiring a data receiver to adopt a sampling frequency that is an integer multiple of the data bit rate.

When generating digital information in the form of binary signals, each binary bit is assigned to a respective time slot. The time slots are typically of equal duration as determined by a clock signal having a frequency corresponding to the desired bit rate of the binary signal. To assist in the transmission of the digital signal (e.g., in wireless radio communication), a modulation scheme may be used to represent a binary one or zero value. When such a signal is received, the detection or demodulation of the original binary signal depends on timing information being available to identify the correct time slots. It is usually not practical to transmit the original clock signal with the binary data signal. Consequently, it is usually desirable to recover the clock timing from the transmitted data signal itself.

The Radio Data System (RDS) in Europe and the Radio Broadcast Data System (RBDS) in North America are examples of systems employing wireless broadcasting of digital data. In these systems, a digital data stream supplementing an analog radio (e.g., FM) broadcast is broadcast on a subcarrier using binary modulated signals. By properly demodulating the encoded data, the digital data stream is able to provide the receiver with various enhanced features, such as textual display of program or format type identification, displaying broadcaster name identification, displaying song information (e.g., song title and artist), and providing alternate frequencies for automatic retuning of a radio receiver to another transmitter in a common network when the signal from the current transmitter becomes weak, for example.

The RDS/RBDS data is added to a multiplexed FM broadcast signal using double-sideband, suppressed carrier modulation at a frequency of 57 kHz. The digital data is bi-phase encoded at a data rate of 1,187.5 bits per second. Each binary bit (i.e., either a one or a zero) is represented by a symbol wherein the transitional direction of the time varying signal at the midpoint of a bit time slot signifies the bit value. In order to decode the proper bit values, a proper clock timing signal must be recovered so that the relative phase of each bit symbol can be distinguished.

In prior art RDS/RBDS receivers, the sampling frequency at which the bi-phase encoded data is sampled has been chosen as an integer multiple of the bit rate (i.e., an even amount of integer samples occur during a time slot of the digital data). As a result, it becomes straightforward to generate a clock signal matching the frequency of the bit rate (e.g., by counting at the sample rate to create an alternating clock signal). The clock signal must also have its phase aligned with the original clock signal. The phase alignment can be accomplished by referencing to the data itself.

Requiring the sampling frequency to be a multiple of the data bit rate may be an undesirable constraint on the design of a particular receiver. In addition, prior art clock recovery implementations have been customized to each particular receiver and have not been portable to other receiver designs. With each new model of a receiver, a new, unique clock recovery apparatus must be designed in accordance with other details of the receiver design (e.g., sampling frequency and data bit rate). The effort to create a custom design results in increased cost and development time.

SUMMARY OF THE INVENTION

The present invention has the advantage of allowing any arbitrary selection of sampling rate versus data bit rate while maintain a recovered clock timing signal of sufficient accuracy to reliably decode the digital data. Furthermore, the present invention provides a clock timing recovery method and apparatus that easily adapts to different sampling frequencies and data bit rates by only adjusting a few parameters that may be stored in an electronic memory, thereby providing a re-usable digital signal processing (DSP) building block and reducing development time and cost of receivers using the invention.

In one aspect of the invention, a method is provided for regenerating a bit timing signal from an encoded digital signal in a receiver using a predetermined sample rate $F_s$. An input pulse signal is generated in response to predetermined transitions of the encoded digital signal. A clock count signal is generated having a variable clock period according to cyclical counting of the clock count signal up to a count value S at the predetermined sample rate, the count value alternating between an upper value $S_u$ and a lower value $S_l$ so that the variable clock period has an average length substantially equal to a data bit period of the encoded digital signal. The clock count signal is synchronized with the encoded digital signal by 1) counting the input pulse signals to generate a pulse count, 2) counting sampling periods between successive input pulse signals to generate a sample count, and 3) generating a sync signal if the pulse count is greater than a pulse threshold and the sample count is greater than a sample threshold. The clock count signal and the pulse count are reset in response to the sync signal.

BRIEF DESCRIPTION OF THE DRAWINGS

FIG. 5 shows example waveforms within the synchronizer for generating a sync signal.

FIG. 6 shows an accumulated error signal used by the clock generator to select a variable clock period.

FIG. 7 shows sample values for parameters used in the clock generator to regenerate a data clock signal.

DETAILED DESCRIPTION OF PREFERRED EMBODIMENTS

Figure 1:
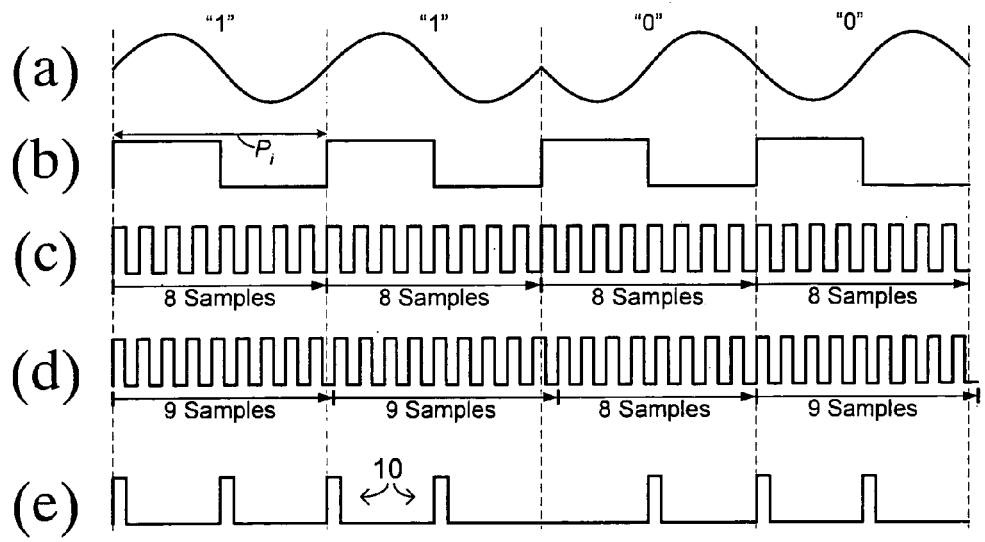
FIGS. 1(a) through (e) illustrate waveforms of various signals in a receiver.

FIG. 1(a) shows an RDS data stream as generated prior to transmission using bi-phase encoding wherein a "1" bit is represented as a single cycle with a first phase (e.g., a negative-going transition at the midpoint of the bit period) and a "0" bit is represented as a single cycle with a second phase which is reversed from the first phase (e.g., a positive-going transition at the midpoint). When consecutive bits have the same value, then a zero-crossing or edge occurs at the beginning, midpoint, and ending of a bit period. When the binary signal changes from one bit value to the other, there is no zero-crossing or edge at the beginning of the corresponding bit period.

FIG. 1(b) shows an ideal clock timing signal corresponding to the timing used to generate the bi-phase encoded data stream and having an ideal bit time slot or bit period $P_t$. FIG. 1(c) shows a sampling frequency that is selected to be an integer multiple of the ideal bit rate or bit frequency so that a whole number of sampling frequency timing pulses are produced for each cycle of the ideal bit timing signal. For example, a sampling frequency that is 8 times the bit rate is shown (i.e., 8 sample pulses occur for each bit period). Provided that the timing references used to generate the original binary signal and the sampling frequency are each sufficiently accurate to specification, a free running counter driven at the sampling frequency can substantially match the frequency of the original clock timing signal. It is known in the art to synchronize the phase of the recovered clock signal by several different methods, including pattern matching (e.g., finding sample windows with equal numbers of positive and negative date sample values) and zero crossing detection (e.g., finding the sample position within the clock cycle that contains the most zero crossings).

In the present invention, it is desired to eliminate the prior art requirement that the sampling frequency used in the receiver was an integer multiple of the data bit rate. For example, a data bit rate $R_b$ of an RDS or RDBS signal is 1,187.5 Hz. Prior art receivers have typically used a sampling frequency of 9.5 kHz, so that 8 samples were counted out per RDS bit. Because of other considerations in the design of a receiver, it may be desirable to use a sampling frequency other than a multiple of 1,187.5 Hz. In one possible receiver design, a sampling frequency $F_s$ of 10.546874 kHz could be used which results in a ratio of $F_s$ to $R_b$ of 8.8815789. Since a clock counter can only count integer number, however, it is not possible to count an exact period of the data signal.

The present invention adopts a variable clock period by dynamically alternating the clock count between an integer number sample count S just greater than and just lower than the ratio. Thus, for the above numeric example, the number of samples counted out during the recovered clock period alternates between an upper count value $S_u$ of 9 samples and a lower count value $S_l$ of 8 samples as is shown in FIG. 1(d). A variable clock period is provided with an average length that is substantially equal to the data bit period (i.e., the average value of S approaches the ratio $F_s/R_b$). The resulting error between the recovered clock signal and the ideal clock signal is always less than one sample period. Provided that the recovered clock signal is properly phased (i.e., synchronized), it can satisfactorily be used to decode the digital data signal.

In a preferred embodiment, the present invention synchronizes the clock signal based on detecting a zero crossing that occurs at the middle of a bit period. As shown in FIG. 1(e), an input pulse signal comprising pulses 10 is generated based on zero crossings of the data signal of FIG. 1(a). When consecutive bits have the same value, pulses 10 are more closely spaced because zero crossings occur at the beginning, middle and ends of a bit period. When the bit value changes, there is no zero crossing at the beginning of the new bit period, creating a longer interval between pulses 10. This longer interval is detected and the next pulse 10 is known to occur at the middle of a bit period, thereby allowing synchronization.

Figure 2:
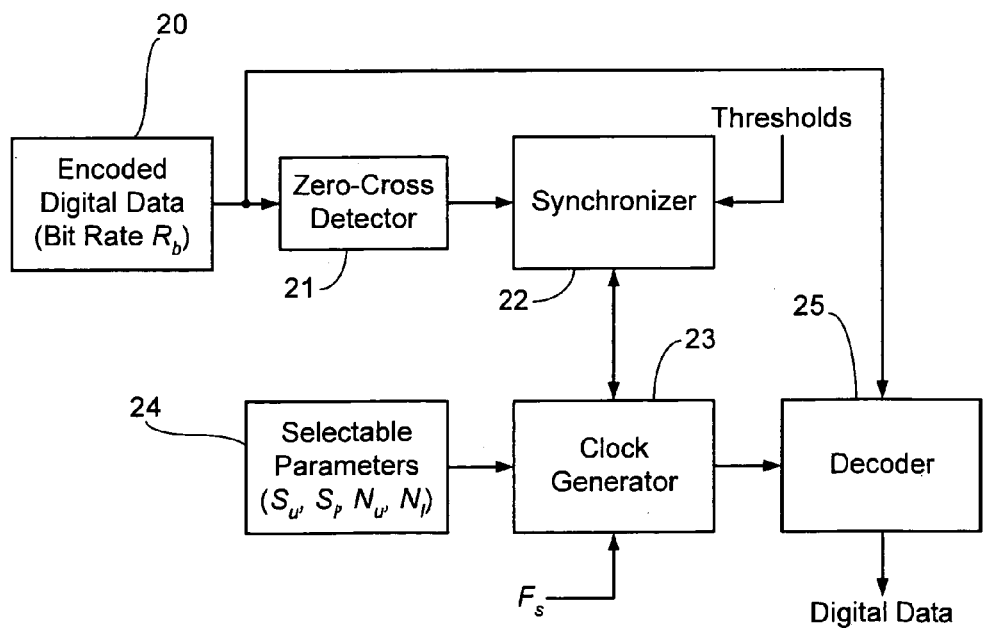
FIG. 2 is a block diagram of a preferred embodiment of a clock recovery apparatus of the present invention.

One preferred apparatus for implementing the present invention using digital signal processing (DSP) components is shown in FIG. 2. A receiver front end 20 provides an encoded digital data signal having a bit rate $R_b$. Front end 20 may comprise a radio tuner and demodulator for receiving an RDS broadcast, for example. The encoded digital data signal is provided to a zero-crossing detector 21 and to a decoder 25. Input pulses from zero-crossing detector 21 are provided to a synchronizer 22. Based on certain thresholds also provided to synchronizer 22, a synchronization or sync signal is provided to a clock generator 23.

A programmable memory 24 contains selectable parameters used by clock generator 23 to generate almost any arbitrary recovered clock frequency based on a sampling frequency $F_s$ which may have almost any arbitrary frequency. The selectable parameters include upper and lower count values $S_u$ and $S_l$ and duty cycle limits $N_u$ and $N_l$ described below. Using sampling frequency $F_s$ as a counting reference, clock generator 23 regenerates the clock timing signal which is provided to decoder 25 to regenerate the original binary data stream.

Figure 3:
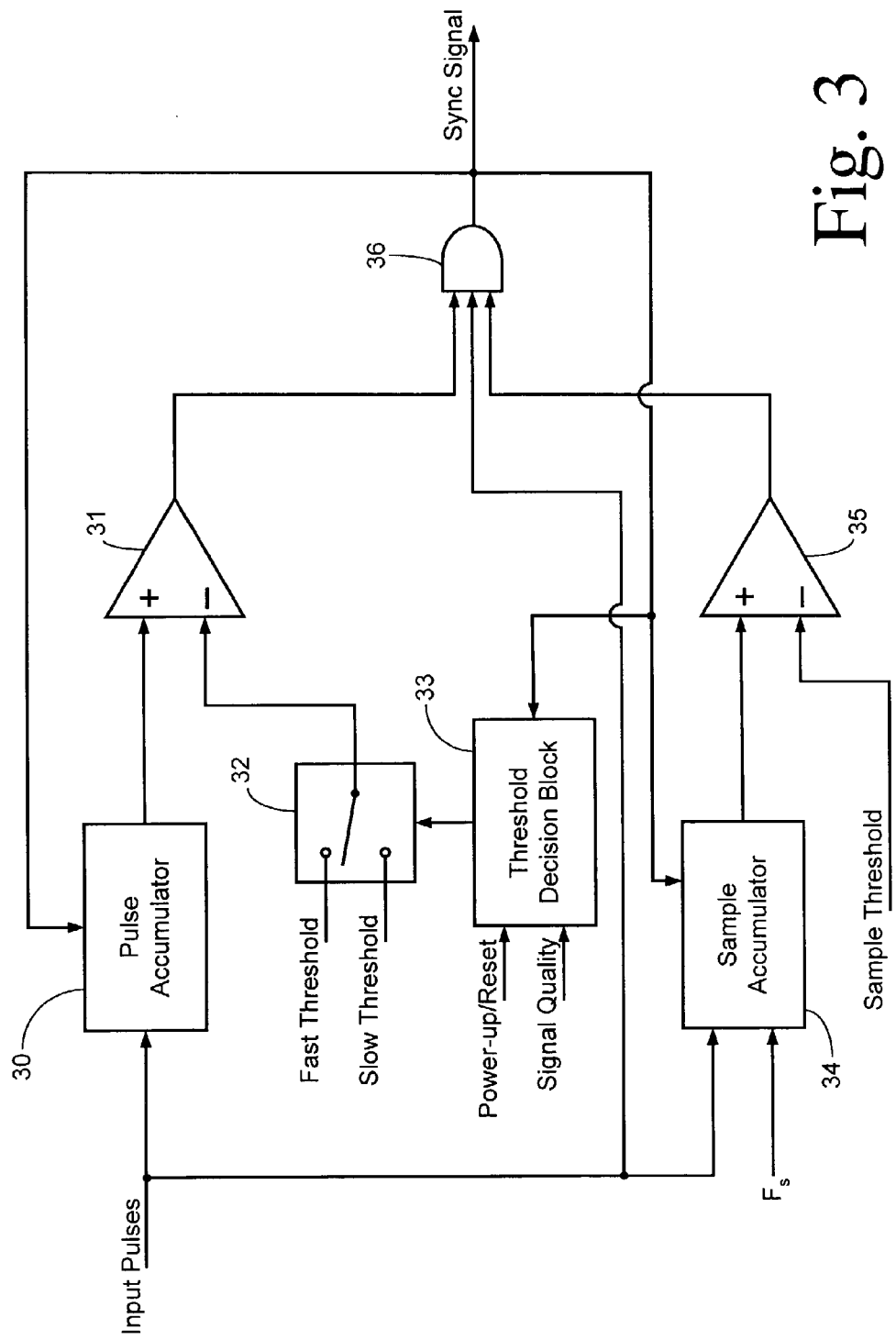
FIG. 3 is a block diagram of a synchronizer of the present invention.

Synchronizer 22 is shown in greater detail in FIG. 3. Input pulses are input to a pulse accumulator 30 which maintains an integer pulse count of the number of input pulses that have occurred since the last time accumulator 30 was reset. The pulse count is provided to one input of a comparison block 31 for comparing the pulse count to a threshold. Either a fast re-sync threshold or a slow re-sync threshold is provided to the remaining input of comparison block 31 via a selector switch 32. Switch 32 is controlled by a threshold decision block 33 which receives the sync signal, a power-up/reset signal, and a signal-quality signal. During most normal conditions while receiving a strong data signal not corrupted by significant noise, the slow re-sync threshold is used since a reliable synchronization is achieved. When a receiver is first powered up or when reset (e.g., after changing radio reception to a different RDS broadcast station), the fast re-synch threshold with a lower count value is used so that re-synchronization happens sooner. During times of poor signal quality (e.g. weak and/or noisy signals), accurate synchronization is more difficult and therefore should happen more frequently. The signal-quality signal may, for example, be obtained from the date decoder in response to the detected bit errors in the finally decoded digital signal. Threshold decision block 33 uses the sync signal to gate any change in the setting of switch 32.

The input pulse signal is also provided to a sample accumulator 34 which counts the sample frequency $F_s$ between adjacent input pulses (i.e., the sample count is reset by each input pulse). The sample count is provided to one input of a comparison block 35 which receives a sample threshold at its other input. The sample threshold signifies the time (i.e., number of samples counted) between zero crossings when a phase reversal (i.e., change of bit value) occurs in the data signal. Thus, the sample threshold has an integer value between the number of samples counted during a bit period (i.e., $F_s/R_b$) and the number counted during one-half a bit period. In the above numerical example where $F_s/R_b$ equals 8.8815789, a sample threshold of 6 could be used.

The present invention generates a sync signal or sync pulse when both the pulse count is greater than the re-sync threshold currently selected and the sample count is greater than the sample threshold. Thus, the outputs of comparison blocks 31 and 35 are coupled to respective inputs of an AND-gate 36. A third input of AND-gate 36 receives the input pulse signal so that the sync signal is triggered at the appropriate time of a zero crossing.

Waveforms relating to the synchronization function are shown in FIG. 5. The contents of the pulse accumulator are shown in FIG. 5(a) as it increases from being initialized a zero. A pulse threshold is shown for providing relatively fast resynchronization. FIG. 5(b) shows the contents of the sample accumulator which counts between the input pulses. When a zero crossing is "missing" because of a phase reversal (i.e., bit change) in the bi-phase data signal, the sample count is incremented beyond the sample threshold (which ensures that the next input pulse coincides with the center of a bit period). When the counts in both FIGS. 5(a) and 5(b) exceed their thresholds, then the sync signal pulse is produced as shown in FIG. 5(c).

Figure 4:
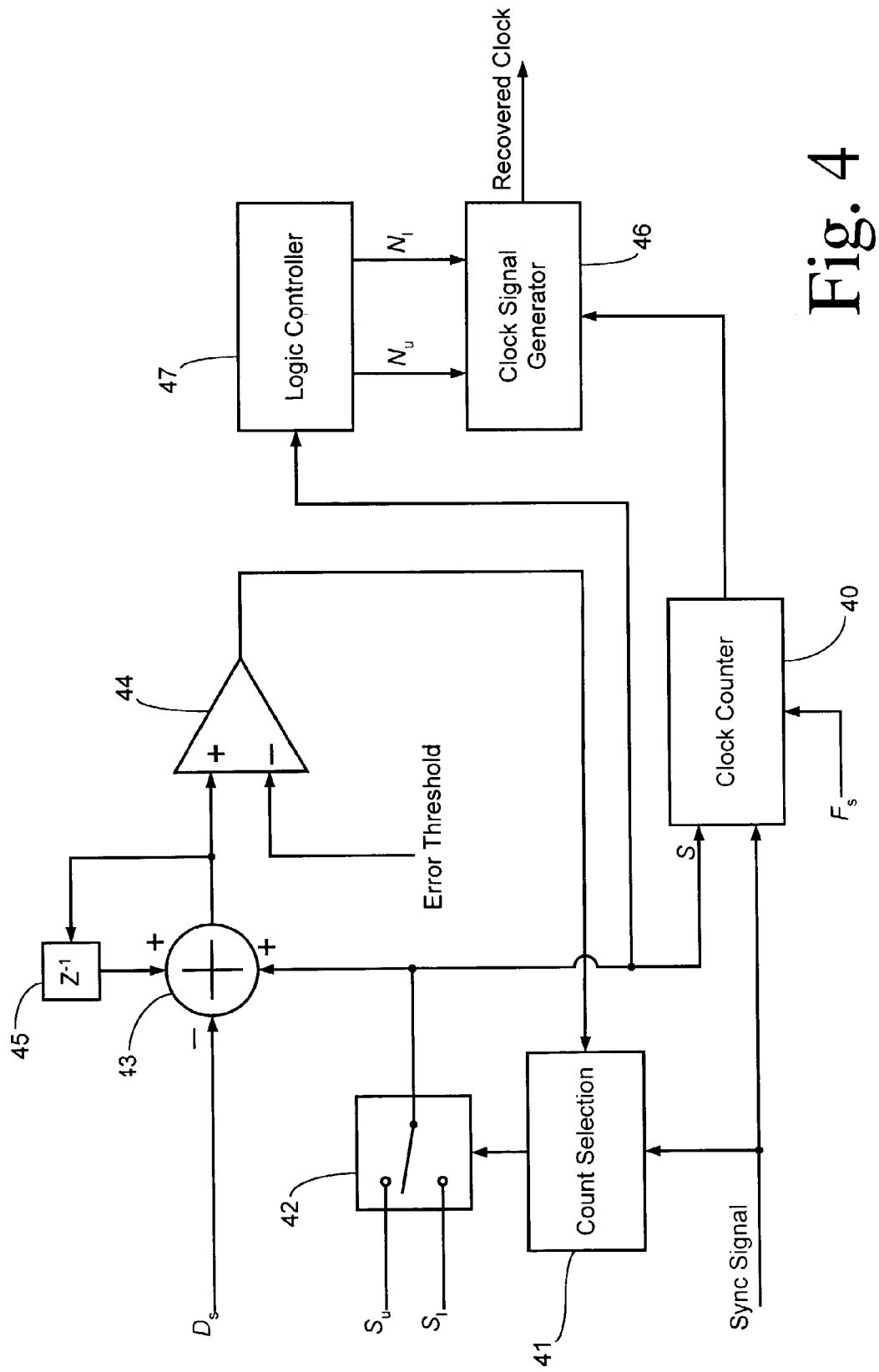
FIG. 4 is a block diagram of a clock generator of the present invention.

Clock generator 23 is shown in greater detail in FIG. 4. The sync signal is provided to a clock counter 40 and a count selection block 41. Clock counter 40 produces a cyclical count according to the current count value S (the actual count typically runs from zero to S−1) at the rate determined by sampling frequency $F_s$. Preconfigured count values $S_u$ and $S_l$ are provided to respective inputs of a selector switch 42 controlled by count selection block 41. The selected count value is output by switch 42 to clock counter 40, a subtracting output of a summer 43, and a logic controller 47. An adding input of summer 43 receives a sample rate/data rate ratio $D_s$ (equal to $F_s/R_b$). The output of summer 43 is connected to an input of an error comparison block 44 and to the input of a unit delay block 45. The output of unit delay block 45 is connected to a third input of summer 43. An error threshold is provided to the remaining (e.g., inverting) input of comparison block 44.

The output of comparison block 44 is coupled to count selection block 41 to provide a high logic level signal when the accumulated error (i.e., the sum of any previous error and the current error resulting from the difference between the ideal bit period of the data signal and the variable clock period corresponding to the current value of S) is greater than the error threshold. The error threshold corresponds to the number of sample periods by which the regenerated clock signal is allowed to drift from the ideal value before the count value is switched in order to change the direction of the error growth. When the output from comparison block 44 is high, count selection block switches to the other count value upon the next occurrence of the sync signal.

The upper or lower count value that is closer to the value of $D_s$ is preferably used the majority of the time so that the error accumulates more slowly. When the accumulated error is below the threshold, the closer count value is selected by selection block 41. Once the accumulated error exceeds the threshold, just a single use of the other count value is necessary to change the sign of the accumulated error. The selection of count value S as a function of the accumulated error versus the error threshold is shown in FIG. 6.

Preferably, an error threshold value close to, but preferably not equal to, one half is selected in order to provide good tracking of the regenerated clock signal to the ideal signal. If the fractional part of $D_s$ is greater than 0.5, then the error threshold is preferably also assigned a value greater than 0.5 (and if the fractional part is less than 0.5 then the error threshold is also less than 0.5).

Continuing the above numerical example, count selection block 41 initially selects upper count value $S_u$ (e.g., 9) to be used. An error threshold of 0.6 is used. Once the beginning of a regenerated clock cycle is late by 0.6 sample periods, count selection block 41 selects lower count value $S_l$ (e.g., 8) so that the next regenerated clock cycle begins early.

The regenerated clock signal from clock counter 40 which is synchronized (i.e., begins a new counting cycle at zero) at the midpoint of the data bit period is provided to a clock signal generator block 46 which encodes the clock count into a binary recovered clock signal. The alignment of the regenerated clock signal to the counting cycle of clock counter 40 and the duty cycle of the regenerated clock signal are controlled by logic controller 47 through the setting of duty cycle limits $N_u$ and $N_l$. More specifically, clock signal generator 46 produces a square-wave clock signal (e.g., varying between high and low logic levels) that is encoded at a high level when the count output by clock counter 40 has a value from $N_l$ to $N_u$, inclusive. By adjusting the values of $N_u$ and $N_l$, any arbitrary duty cycle or any phase relationship between the clock count can be obtained. In a typical embodiment wherein a 50% duty cycle is desired with the regenerated clock signal having a negative transition at the middle of a bit period, the values of $N_l$ and $N_u$ would span the second half of a counting cycle of clock counter 40 (e.g., a value of 4 for $N_l$ and a value of 7 for $N_u$ when the value of the clock count S is 8).

FIG. 7 shows various signal values during operation of the present invention using the parameters of the above numerical example for successive sample periods moving toward the right in FIG. 7. The count value S is initially the upper value 9, so that the clock count is cycling from 0 through 8. Using values of 4 for $N_l$ and 7 for $N_u$, the recovered clock signal has a value of zero for the first four sample time slots and a value of one for the next five sample time slots. At the end of this counting cycle, it is determined that the accumulated error has exceeded the threshold. Therefore, the count value S is switched to the lower value of 8. Simultaneously, the value of $N_u$ is switched to 7 to take into account the shorter counting cycle. This second counting cycle ends when the count reaches 7, at which time the error has been reduced to an amount below the error threshold. Therefore, count value S is switched back to its upper value of 9 and $N_u$ is changed back to 8. After a few counts, a sync signal occurs and the clock count is reinitiated at zero.

What is claimed is:

1. A method of regenerating a bit timing signal from an encoded digital signal in a receiver using a predetermined sample rate $F_s$, said method comprising the steps of:
   generating an input pulse signal in response to predetermined transitions of said encoded digital signal;
   generating a clock count signal having a variable clock period according to cyclical counting of said clock count signal up to a count value S at said predetermined sample rate, said count value alternating between an upper value $S_u$ and a lower value $S_l$ so that said variable clock period has an average length substantially equal to a data bit period of said encoded digital signal;
   synchronizing said clock count signal with said encoded digital signal by 1) counting said input pulse signals to generate a pulse count, 2) counting sampling periods between successive input pulse signals to generate a sample count, and 3) generating a sync signal if said pulse count is greater than a pulse threshold and said sample count is greater than a sample threshold; and resetting said clock count signal and said pulse count in response to said sync signal.

2. The method of claim 1 wherein said pulse threshold is selectable between a fast re-sync threshold and a slow re-sync threshold.

3. The method of claim 2 further comprising the step of:
selecting said slow re-sync threshold when said encoded digital signal is received with a predetermined quality and selecting said fast re-sync threshold when said encoded digital signal is received with less than said predetermined quality.

4. The method of claim 3 wherein said fast re-sync threshold is further selected when initiating reception of said encoded digital signal.

5. The method of claim 1 wherein said encoded digital signal is encoded using biphase encoding, and wherein said sample threshold has a length selected to detect a phase reversal in said encoded digital signal.

6. The method of claim 1 wherein said resetting step further comprises resetting said sample count in response to said sync signal.

7. The method of claim 1 further comprising the step of selecting said upper value $S_u$ or said lower value $S_l$ for said count value during a particular clock period according to the steps of:
generating a sum of 1) a difference between said data bit period of said encoded digital signal and a current value of said variable clock period and 2) an error carried over from prior variable clock periods;
comparing said sum with an error threshold; and
choosing between said upper value $S_u$ and said lower value $S_l$ in response to said comparison.

8. The method of claim 7 wherein said upper value $S_u$ is chosen when said sum is less than said error threshold and said lower value $S_l$ is chosen when said sum is greater than said error threshold.

9. The method of claim 7 wherein said difference is determined by:
determining a ratio of said predetermined sample rate $F_s$ and a data bit rate $R_b$ of said encoded digital signal; and
subtracting a current value of said count value S from said ratio.

10. The method of claim 7 further comprising the step of: resetting said count value S to said upper value $S_u$, in response to said sync signal.

11. The method of claim 1 further comprising the step of:
encoding said clock count signal into a bi-level recovered clock signal in response to predetermined count segments.

12. Apparatus for regenerating a bit timing signal from an encoded digital signal in a receiver using a predetermined sample rate $F_s$, said apparatus comprising:
an input pulse generator coupled to said encoded digital signal and generating input pulse signals triggered by said encoded digital signal;
a clock generator providing a clock count signal having a variable clock period according to cyclical counting of said clock count signal up to a count value S at said predetermined sample rate, said count value alternating between an upper value $S_u$, and a lower value $S_l$ so that said variable clock period has an average length substantially equal to a data bit period of said encoded digital signal; and
a synchronizer coupled to said input pulse generator and to said clock generator for 1) counting said input pulse signals to generate a pulse count, 2) counting sampling periods between successive input pulse signals to generate a sample count, and 3) generating a sync signal to reset said clock count signal if said pulse count is greater than a pulse threshold and said sample count is greater than a sample threshold.

13. The apparatus of claim 12 further comprising:
a clock signal encoder for encoding said clock count signal into a bi-level recovered clock signal in response to predetermined count segments.

14. The apparatus of claim 12 wherein said synchronizer includes a pulse threshold selector for selecting between a fast re-sync threshold and a slow re-sync threshold.

15. The apparatus of claim 14 wherein said pulse threshold selector selects said slow re-sync threshold when said encoded digital signal is received with a predetermined quality and selecting said fast re-sync threshold when said encoded digital signal is received with less than said predetermined quality.

16. The apparatus of claim 14 wherein said pulse threshold selector selects said fast re-sync threshold when initiating reception of said encoded digital signal.

17. The apparatus of claim 12 further comprising:
a summer for generating a sum of 1) a difference between said data bit period of said encoded digital signal and a current value of said variable clock period and 2) an error carried over from prior variable clock periods;
a comparison block for comparing said sum with an error threshold; and
a count selection block for selecting between said upper value $S_u$ and said lower value $S_l$ in response to said comparison.

* * * * *